United States Patent
Jagannati et al.

(10) Patent No.: US 11,880,567 B2
(45) Date of Patent: Jan. 23, 2024

(54) QUORUM IN A DISTRIBUTED SYSTEM

(71) Applicant: Cohesity, Inc., San Jose, CA (US)

(72) Inventors: Harsha Vardhan Jagannati, Fremont, CA (US); Abhishek Sharma, Newark, CA (US)

(73) Assignee: Cohesity, Inc., San Jose, CA (US)

( * ) Notice: Subject to any disclaimer, the term of this patent is extended or adjusted under 35 U.S.C. 154(b) by 0 days.

(21) Appl. No.: 17/681,471

(22) Filed: Feb. 25, 2022

(65) Prior Publication Data

US 2023/0273726 A1    Aug. 31, 2023

(51) Int. Cl.
*G06F 3/06* (2006.01)
(52) U.S. Cl.
CPC ............ *G06F 3/0605* (2013.01); *G06F 3/067* (2013.01); *G06F 3/0659* (2013.01)
(58) Field of Classification Search
None
See application file for complete search history.

(56) References Cited

U.S. PATENT DOCUMENTS

| | | | |
|---|---|---|---|
| 2004/0152499 A1* | 8/2004 | Lind | G07F 17/3286 463/16 |
| 2018/0091583 A1* | 3/2018 | Collins | H04L 67/30 |
| 2018/0189100 A1* | 7/2018 | Nemoto | G06F 9/4831 |
| 2019/0273606 A1* | 9/2019 | Okabe | H04L 9/0643 |
| 2020/0204357 A1* | 6/2020 | Seyfried | H04L 9/3215 |
| 2022/0277107 A1* | 9/2022 | Beekman | G06F 21/6281 |

* cited by examiner

*Primary Examiner* — Brian R Peugh
(74) *Attorney, Agent, or Firm* — Van Pelt, Yi & James LLP

(57) ABSTRACT

A request to perform a storage operation for a storage system is received. It is determined that the requested storage operation is associated with a policy that requires a quorum of approvals before being allowed to be performed. It is determined whether the quorum of approvals has been obtained. In response to a determination that the quorum of approvals has been obtained, a command to perform the requested operation is provided to the storage system.

16 Claims, 4 Drawing Sheets

QUORUM IN A DISTRIBUTED SYSTEM

BACKGROUND OF THE INVENTION

A user account associated with a storage system may be created and given privileges to perform certain operations with respect to the storage system. A user may log in to the storage system using credentials associated with the user account and unilaterally request the storage system to perform any operation that the privileges of the user account permit. As a result, the storage system is vulnerable to security risks, such as credential leaks, insider threats, and execution of unintentional critical operations (e.g., cluster destroy).

BRIEF DESCRIPTION OF THE DRAWINGS

Various embodiments of the invention are disclosed in the following detailed description and the accompanying drawings.

DETAILED DESCRIPTION

Figure 1:
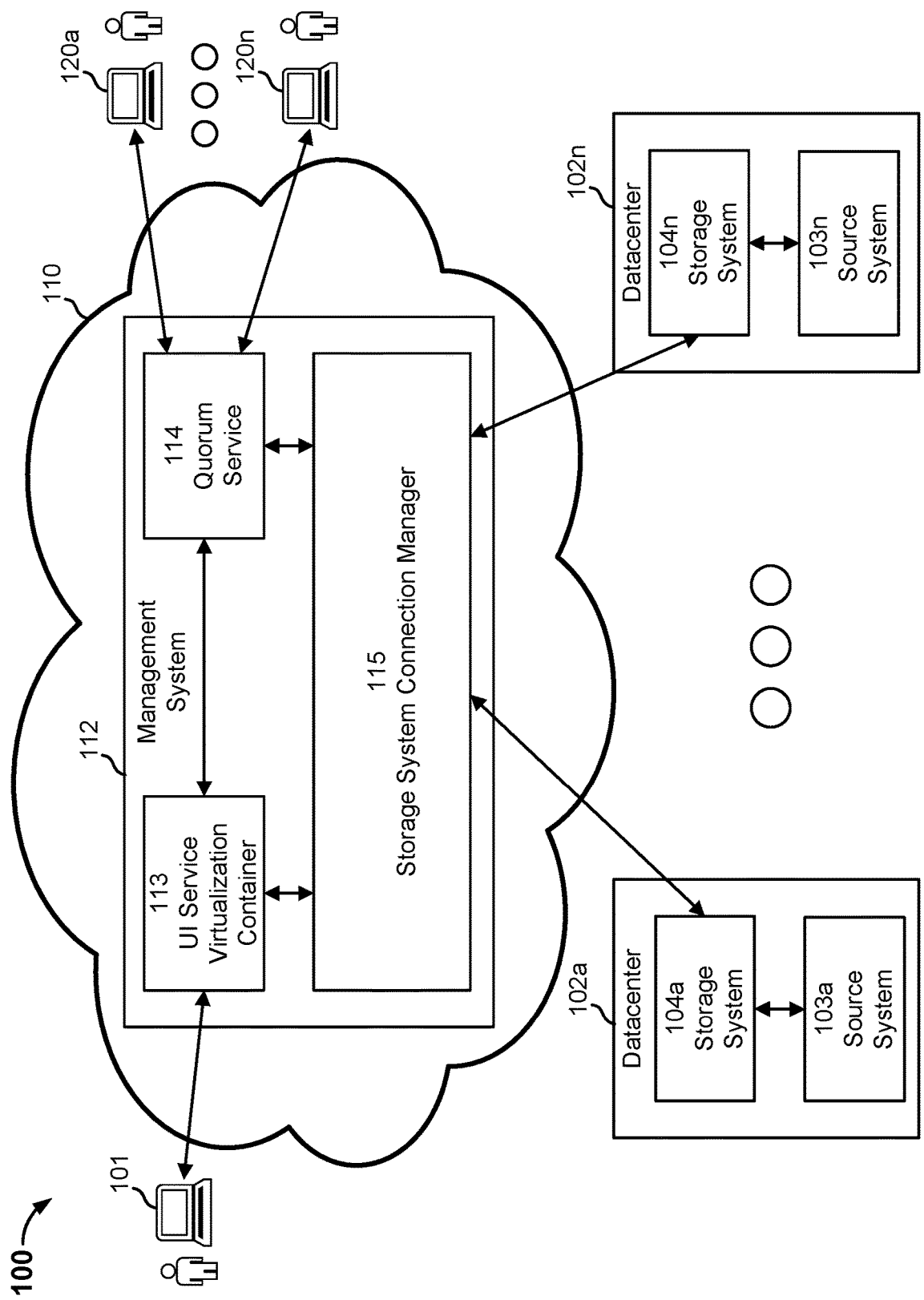
FIG. 1 is a block diagram illustrating a distributed system for implementing a quorum in accordance with some embodiments.

Techniques to improve security in a distributed system are disclosed herein. The distributed system includes a cloud-based management system and one or more storage systems associated with an entity (e.g., a user, a business, an enterprise, an institution, a government, a corporation, an organization, etc.). The techniques disclosed herein improve security by reducing the likelihood that a single user, either through user abuse or a hacked user account, can unilaterally cause the one or more storage systems to perform one or more operations to the detriment of the entity associated with the one or more storage systems.

The entity associated with the one or more storage systems provides to the cloud-based management system a quorum specification that includes a set of operations that require a quorum of approvals before any operation included in the set is allowed to be performed. The quorum specification also includes a set of approvers that need to approve any operation included in the set of operations before any operation included in the set is allowed to be performed. In some embodiments, the quorum specification indicates one or more storage systems that are allowed to perform an operation. In some embodiments, the quorum specification indicates that all of the storage systems associated with an entity are permitted to perform an operation. In some embodiments, the quorum specification indicates that some of the storage systems associated with an entity are permitted to perform an operation (e.g., at least one of the storage systems is not permitted to perform an operation).

The set of operations may include operations that a nefarious user would seek to exploit. For example, the set of operations may include removing one or more nodes from a storage system, removing a particular object from the storage system, modifying a configuration associated with the storage system, modifying the number of approvers needed to obtain a quorum (e.g., modifying the number from 4 approvers to 1 approver), deleting an approver from the set of approvers, modifying one or more privileges associated with a user account (e.g., a hacker wants admin level privileges), adding a new operation or removing an existing operation from the set of operations, adding or removing an administrator of the storage system, modifying protocols supported by the storage system, modifying an audit log retention period, suppressing alerts, disabling two-factor authentication, adding one or more nodes to the storage system, etc.

The quorum specification specifies a number of approvers included in the set of approvers that need to approve an operation included in the set of operations to obtain a quorum of approvals. In some embodiments, a quorum of approvals is needed from at least a subset of approvers in the set of approvers. In some embodiments, a quorum of approvals is needed from a majority of approvers in the set of approvers. In some embodiments, a quorum of approvals is needed from all of the approvers included in the set of approvers. In some embodiments, all of the operations included in the set of operations require the same quorum. In some embodiments, at least one of the operations included in the set of operations requires a different quorum than the other operations included in the set of operations. For example, a first operation may require a majority approval from the approvers and a second operation may require all approvers to approve the second operation.

In response to receiving the quorum specification, the cloud-based management system generates a policy based on the quorum specification and provides an indication of one or more operations subject to the policy to the one or more storage systems associated with the entity. The indication identifies the one or more operations associated with a storage system that require a quorum of approvals. In response to receiving a corresponding indication, the one or more storage systems associated with the entity generate a corresponding data structure (e.g., list, table, etc.), store the corresponding data structure, and utilize the corresponding data structure to determine whether or not to perform an operation.

A user may login to a storage system associated with the entity using a user account associated with the storage system. The user may request the storage system to perform an operation. In response to receiving the request, the storage system determines whether the requested operation is an operation that requires a quorum. In response to a determination that the requested operation does not require a quorum, the storage system performs the requested operation. The requested operation may be subject to local permissions at the storage system (e.g., whether the user has permissions to perform the requested operation). In response to a determination that the requested operation requires a quorum (e.g., remove a storage node from the storage system), the storage system provides to the user a notification that the storage system is unable to perform the requested operation. This prevents the user from unilaterally causing the storage system to perform an operation that may disrupt operation of the storage system. The notification may also notify the user to login to the cloud-based management system using a user account associated with the cloud-based management system and request the cloud-based management system to approve and initiate the requested operation.

In some embodiments, a user having a user account associated with the storage system does not also have a user account associated with the cloud-based management system. In such embodiments, this provides an additional layer of security because a malicious actor may have obtained the login credentials of a user account associated with a storage system, but did not obtain the login credentials of a user account associated with the cloud-based management system. In some embodiments, a user having a user account associated with the storage system also has a user account associated with the cloud-based management system.

A user logs in to the cloud-based management system via a user account associated with the cloud-based management system. The user provides a request for a storage system to perform an operation. In response to receiving the request, the cloud-based management system determines whether the requested operation is associated with a policy that requires a quorum of approvals before being allowed to be performed. In response to a determination that the requested operation is not associated with the policy, the cloud-based management system provides to the storage system a command to perform the requested operation. In response to a determination that the requested operation is associated with the policy, the cloud-based management system adds the request to an approval request queue and provides to the approvers included in the set of approvers a notification of the requested operation. The notification may be provided via electronic mail, text message, automated telephone call, etc. The notification may request an approver to login to the cloud-based management system to approve the requested operation. In some embodiments, the approver is able to approve the requested operation from the device that received the notification.

The cloud-based management system initiates a timer that indicates when a quorum of approvals for the requested operation needs to be received. In some embodiments, the timer is specified by an administrator associated with the entity. In some embodiments, the timer is a default amount of time (e.g., 30 minutes). The cloud-based management system waits for responses from the approvers included in the set of approvers. The cloud-based management system determines whether the required number of approvals for the requested operation has been received within a period of time associated with the timer. In response to a determination that the required number of approvals for the requested operation has been received within the period of time associated with the timer, the cloud-based management system determines that a quorum has been obtained and provides to the storage system a command to perform the requested operation. In some embodiments, the cloud-based management system provides the command to the storage system as soon as the quorum has been obtained. In some embodiments, the cloud-based management system provides the command to the storage system after the timer has expired. This provides the approvers the ability to change their response in the event they accidentally approved the requested operation. In response to a determination that the required number of approvals for the requested operation has not been received within the period of time associated with the timer, the cloud-based management system denies the requested operation from being performed and provides to the user a notification that the requested operation has been denied. The cloud-based management system may log each time a requested operation is denied. In some embodiments, an anomalous behavior detection system analyzes the denied operations included in a log to determine whether there is anomalous behavior. In some embodiments, the anomalous behavior detection system notifies an administrator in the event a particular operation is denied more than a threshold number of times. In some embodiments, the anomalous behavior detection system notifies an administrator in the event a particular operation is denied more than a threshold number of times within a particular period of time.

FIG. 1 is a block diagram illustrating a distributed system for implementing a quorum in accordance with some embodiments. In the example shown, distributed system 100 includes a cloud-based management system 112 located in cloud environment 110 that is coupled to storage systems 104a . . . 104n. Storage systems 104a . . . 104n are coupled to source systems 103a . . . 103n respectively. Storage system 104a and source system 103a are located in datacenter 102a and storage system 104n and source system 103n are located in datacenter 102n. Although FIG. 1 depicts the cloud-based management system 112 coupled to two storage systems, the cloud-based management system 112 may be coupled to n storage systems where n is an integer and greater than or equal to 1. Source systems 103a . . . 103n may be a server, a virtual machine, a container, a database, etc. Cloud environment 110 (e.g., public cloud, private cloud, hybrid cloud, etc.) may be provided by a cloud provider (e.g., Amazon Web Services™, Microsoft™ Azure, Google Cloud™, etc.).

Storage systems 104a . . . 104n include a corresponding set of storage nodes. A storage system may be comprised of n storage nodes. In some embodiments, the storage nodes are homogenous nodes where each storage node has the same capabilities (e.g., processing, storage, memory, etc.). In some embodiments, at least one of the storage nodes is a heterogeneous node with different capabilities (e.g., processing, storage, memory, etc.) than the other storage nodes of a storage system.

In some embodiments, a storage node of storage systems 104a . . . 104n includes a processor, memory, and a plurality of storage devices. A storage device may be a solid-state drive, a hard disk drive, a flash storage device, etc. The plurality of storage devices may include one or more solid state drives, one or more hard disk drives, one or more flash storage devices, or a combination thereof.

In some embodiments, a storage node of storage systems 104a . . . 104n includes a processor and memory, and is coupled to a separate storage appliance. The separate storage appliance may include one or more storage devices (e.g., flash storage devices). A storage device may be segmented into a plurality of partitions. Each of the storage nodes may be allocated one or more of the partitions. The one or more partitions allocated to a storage node may be configured to store data associated with some or all of the plurality of objects that were backed up to a storage system. For example, the separate storage device may be segmented into 10 partitions and the storage system may include 10 nodes. A storage node of the 10 storage nodes may be allocated one of the 10 partitions.

In some embodiments, a storage node of storage systems 104a . . . 104n includes a processor, memory, and a storage device. The storage node may be coupled to a separate storage appliance. The separate storage device may include one or more storage devices. A storage device may be segmented into a plurality of partitions. Each of the storage nodes may be allocated one or more of the partitions. The one or more partitions allocated to a storage node may be configured to store data associated with some or all of the plurality of objects that were backed up to a storage system. For example, the separate storage device may be segmented into 10 partitions and the storage system may include 10 storage nodes. A storage node of the 10 storage nodes may be allocated one of the 10 partitions.

Storage systems 104a . . . 104n may be a cloud instantiation of a storage system. A configuration of cloud instantiation of storage system 104a . . . 104n may be a virtual replica of storage systems 104a . . . 104n. For example, a storage system may be comprised of three storage nodes, each storage node with a storage capacity of 10 TB. A cloud instantiation of the storage system may be comprised of three virtual nodes, each virtual node with a storage capacity of 10 TB. In other embodiments, a cloud instantiation of a storage system may have more storage capacity than an on-premises instantiation of a storage system. In other embodiments, a cloud instantiation of a storage system may have less storage capacity than an on-premises instantiation of a storage system.

A user associated with an entity (e.g., an administrator) may register storage systems 104a . . . 104n with the cloud-based management system 112. This enables storage systems 104a . . . 104n to be managed via the cloud-based management system 112. A user associated with an entity provides quorum service 114 a quorum specification that includes a set of operations that require a quorum of approvals before any operation included in the set is allowed to be performed. The quorum specification also includes a set of approvers that need to approve any operation included in the set of operations before any operation included in the set is allowed to be performed. Quorum server 114 generates a policy based on the quorum specification. The policy indicates the one or more operations associated with a storage system that require a quorum of approvals. Quorum service 114 is configured to store a copy of the policy.

Cloud-based management system 112 is configured to provide a user device 101 (e.g., a laptop, a desktop, a server, a tablet, a smartphone, etc.) the ability to access and manage storage systems 104a . . . 104n via user interface (UI) service virtualization container 113.

UI service virtualization container 113 may receive from user device 101 a request to perform an operation and provide the request to quorum service 114. The request may include information associated with a destination for the requested operation (e.g., one of the storage systems 104a, 104n). For example, the information may include a specified storage system identifier associated with a storage system that is to perform the requested operation.

In response to receiving the request, quorum service 114 determines whether a stored policy associated with the entity indicates that the requested operation requires a quorum of approvals before a storage system to which the operation is directed is permitted to perform the operation. In the event the requested operation does not require a quorum of approvals, quorum service 114 provides a command to perform the requested operation to storage system connection manager 115, which then provides the command to the storage system using a secure connection (e.g., Google™ Remote Procedure Call (gRPC) connection). In the event the requested operation requires a quorum of approvals, quorum service 114 provides to the computing devices 120a . . . 120n associated with the approvers included in the quorum specification a notification of the requested operation.

The notification may be provided via electronic mail, text message, automated telephone call, etc. The notification may request an approver to login to the cloud-based management system to approve the requested operation. In some embodiments, the approver is able to approve the requested operation from the device that received the notification. Quorum service 114 may store contact information associated with an approver. In some embodiments, quorum service 114 is configured to provide the notification to an approver via a preferred medium of communication (e.g., specified by the approver). In some embodiments, quorum service 114 is configured to provide the notification to all mediums of communication known to be associated with the approver. In some embodiments, quorum service 114 is configured to provide a first notification to an approver via a first communication medium and provide a second notification to the approver via a second communication medium in the event a response is not received from the approver within a threshold period of time. The cloud-based management system may log each time a requested operation is denied. In some embodiments, an anomalous behavior detection system analyzes the denied operations stored in a log to determine whether there is anomalous behavior. In some embodiments, the anomalous behavior detection system notifies an administrator in the event a particular operation is denied more than a threshold number of times. In some embodiments, the anomalous behavior detection system notifies an administrator in the event a particular operation is denied more than a threshold number of times within a particular period of time.

Quorum service 114 may be configured to initiate a timer that indicates when a quorum of approvals for the requested operation needs to be received. In some embodiments, the timer is specified by an administrator associated with the entity. In some embodiments, the timer is a default amount of time (e.g., 30 minutes). The length of the timer may be specific to the type of operation being requested (e.g., a first type of operation is associated with a first period of time and a second type of operation is associated with a second period of time).

The quorum service 114 waits for responses from the approvers included in the set of approvers. The quorum service 114 determines whether the quorum of approvals for the requested operation has been received within a period of time associated with the timer. In response to a determination that the quorum of approvals for the requested operation has been received within the period of time associated with the timer, the quorum service 114 determines that the quorum of approvals has been obtained and provides to the storage system, via storage system connection manager 115, a command to perform the requested operation. In some embodiments, the quorum service 114 provides the notification to the storage system as soon as the quorum of approvals has been obtained. In some embodiments, the cloud-based management system provides the command to the storage system after the timer has expired. This provides approvers the ability to change their response in the event they accidentally approved the requested operation. In response to a determination that the required number of approvals for the requested operation has not been received within the period of time associated with the timer, the quorum service 114 denies the requested operation from being performed and provides to the user device 101 a notification that the requested operation has been denied.

Figure 2:
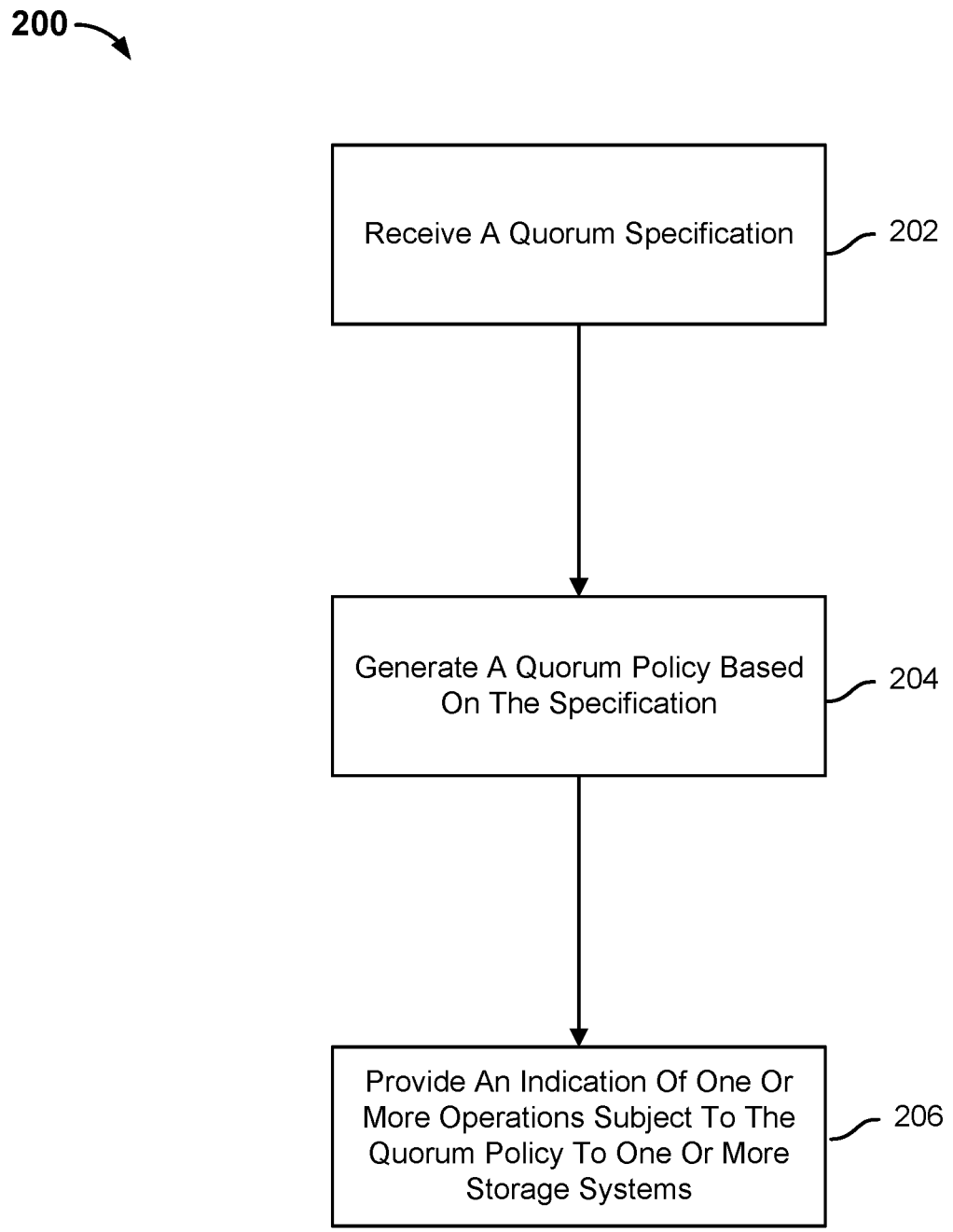
FIG. 2 is a flow diagram illustrating a process for configuring a distributed system to implement a quorum in accordance with some embodiments.

FIG. 2 is a flow diagram illustrating a process for configuring a distributed system to implement a quorum of approvals in accordance with some embodiments. In the example shown, process 200 may be implemented by a cloud-based management system, such as cloud-based management system 112.

At 202, a quorum specification is received. A user associated with an entity provides to the cloud-based management system a quorum specification that includes a set of operations that require a quorum of approvals before any operation included in the set is allowed to be performed. The quorum specification also includes a set of approvers that need to approve any operation included in the set of operations before any operation included in the set is allowed to be performed. In some embodiments, the set of specified approvers includes an administrator associated with the cloud-based management system and an administrator associated with the storage system.

The set of operations may include operations that a nefarious user would seek to exploit. For example, the set of operations may include removing one or more nodes from a storage system, removing a particular object from the storage system, modifying a configuration associated with the storage system, modifying the number of approvers needed to obtain a quorum (e.g., modifying the number from 4 approvers to 1 approver), deleting an approver from the set of approvers, modifying one or more privileges associated with a user account (e.g., a hacker wants admin level privileges), adding a new operation or removing an existing operation from the set of operations, adding or removing an administrator of the storage system, modifying protocols supported by the storage system, modifying an audit log retention period, suppressing alerts, disabling two-factor authentication, adding one or more nodes to the storage system, etc.

At 204, a quorum policy is generated based on the specification. The policy indicates the one or more operations associated with a storage system that require a quorum of approvals. In some embodiments, the quorum policy is generated in response to receiving a quorum specification from a particular type of user associated with the entity (e.g., an administrator).

At 206, an indication of one or more operations subject to the quorum policy is provided to one or more storage systems associated with the entity. In response to receiving the indication, the one or more storage systems associated with the entity generate a data structure that includes the one or more operations, store the data structure, and utilize the data structure to determine whether or not to perform an operation.

The cloud-based management storage system may store the quorum policy such that when a new storage system associated with the entity is registered with the cloud-based management system, the cloud-based management system may provide the quorum policy to the new storage system associated with the entity. This enables the entity to scale its storage system operations without having to generate a new policy to individually configure each new storage system. A user associated with the entity may update the stored quorum policy by adding or removing one or more operations associated with the quorum policy. In response to the update, the cloud-based management system may provide to the one or more storage systems associated with the entity an indication of the one or more operations subject to the updated policy.

Figure 3:
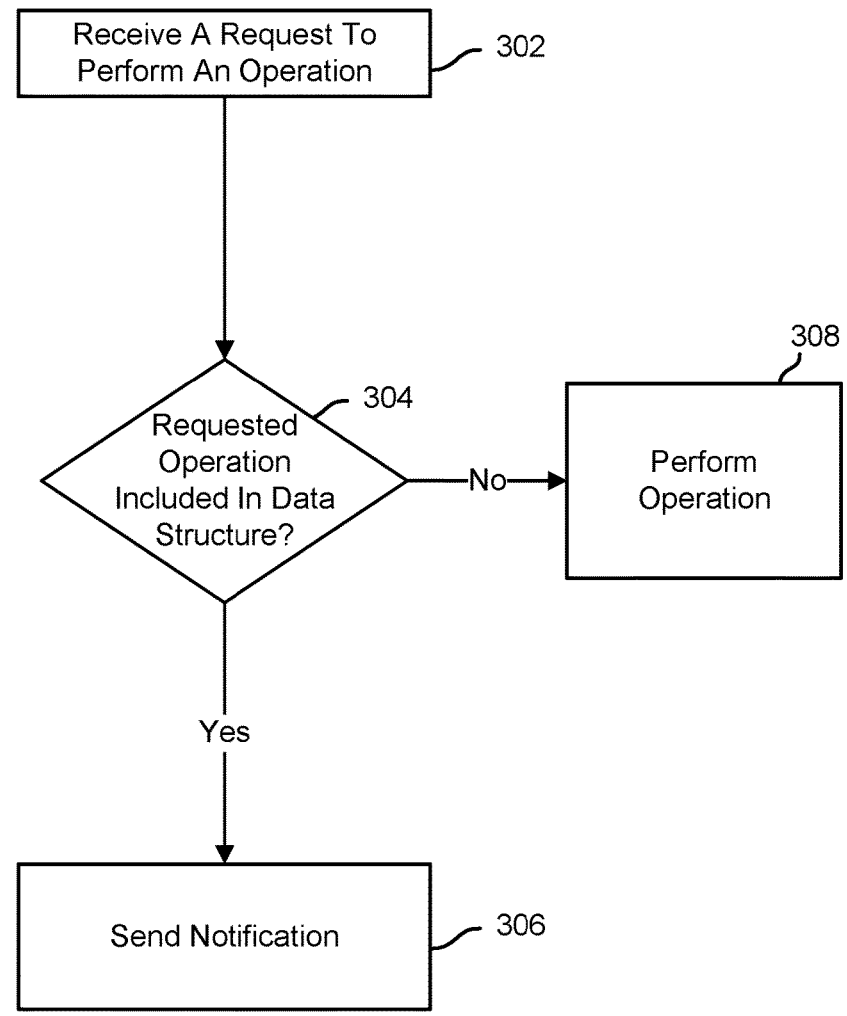
FIG. 3 is a flow diagram illustrating a process for approving an operation in accordance with some embodiments.

FIG. 3 is a flow diagram illustrating a process for approving an operation in accordance with some embodiments. In the example shown, process 300 may be implemented by a storage system, such as storage systems 104a . . . 104n.

At 302, a request to perform an operation is received. A user may login to a storage system associated with the entity using a user account associated with the storage system. The user may request the storage system to perform an operation.

At 304, it is determined whether the operation is included in a data structure of operations that require a quorum of approvals. A cloud-based management system provides an indication of one or more operations subject to quorum approval before the storage system can perform the operation. The storage system inspects a data structure that stores the one or more operations to determine if the requested operation is included in the data structure. In response to a determination that the requested operation is included in the list, process 300 proceeds to 306. In response to a determination that the requested operation is not included in the list, process 300 proceeds to 308.

At 306, a notification is provided indicating that the storage system is unable to perform the operation and that operation requires a quorum of approvals. This reduces the likelihood that a single user, either through user abuse or a hacked user account, can unilaterally cause the storage system to perform one or more operations to the detriment of the entity associated with the storage system. The notification may also notify the user to login to the cloud-based management system using a user account associated with the cloud-based management system and request the cloud-based management system to approve and initiate the requested operation.

At 308, the requested operation is performed.

Figure 4:
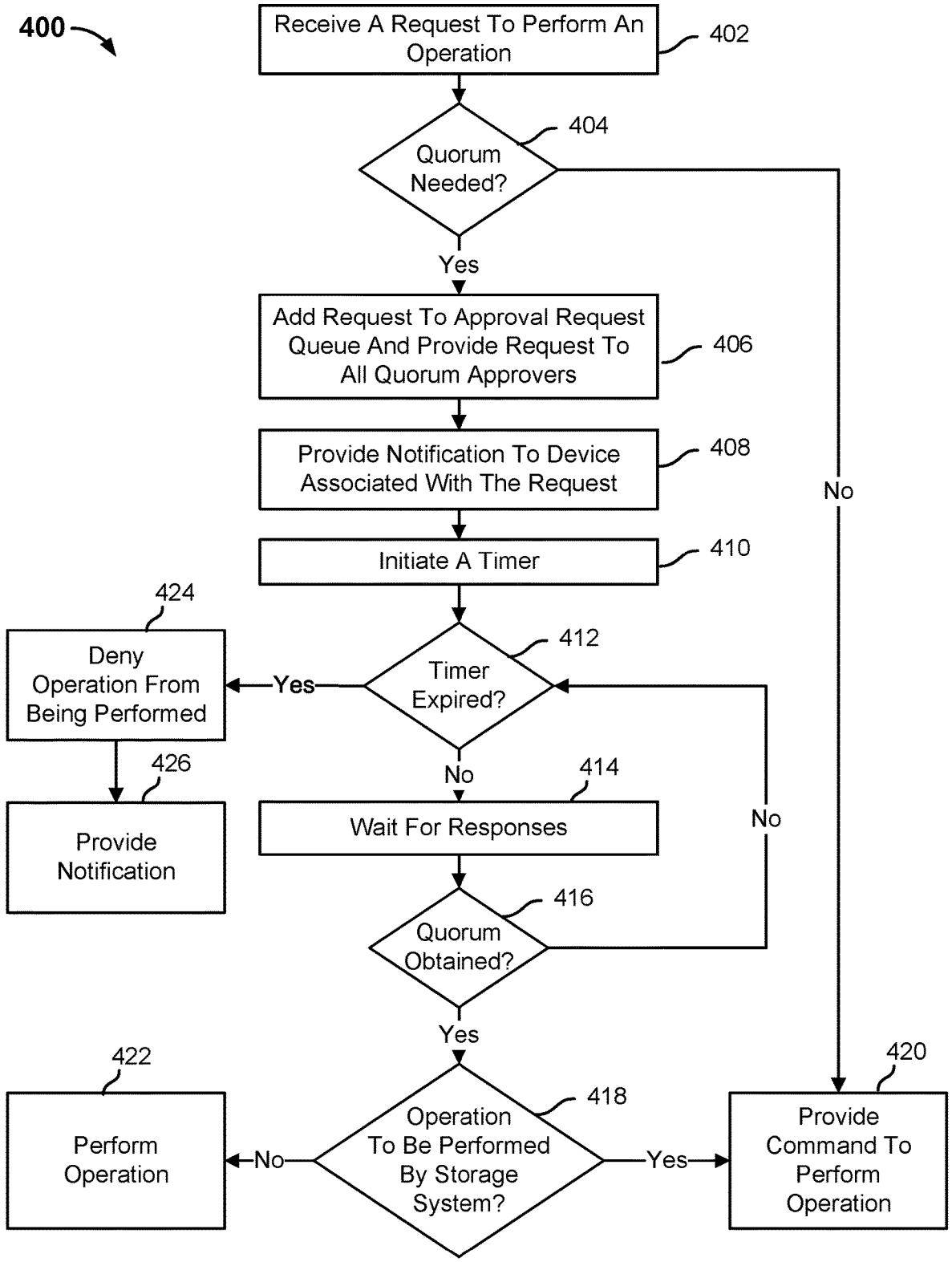
FIG. 4 is a flow diagram illustrating a process for implementing a quorum in a distributed system in accordance with some embodiments.

FIG. 4 is a flow diagram illustrating a process for implementing a quorum in a distributed system in accordance with some embodiments. In the example shown, process 400 may be implemented by a cloud-based management system, such as cloud-based management system 112.

At 402, a request to perform an operation is received. A user logs in to the cloud-based management system via a user account associated with the cloud-based management system. The user provides a request for a storage system to perform an operation.

At 404, it is determined whether a quorum of approvals is needed for the requested operation. The cloud-based management system stores a policy associated with an entity. The policy indicates a set of operations that require a quorum of approvals before any operation included in the set is allowed to be performed by the cloud-based management system or a storage system. The policy may also indicate which storage systems associated with an entity are permitted to perform the requested operation.

In response to a determination that the operation requires a quorum of approvals, process 400 proceeds to 406. In response to a determination that the operation does not require a quorum of approvals, process 400 proceeds to 420 and a command to perform the requested operation is provided to a storage system.

At 406, the request is added to an approval request queue and the request is provided to all approvers included in a set of approvers.

At 408, a notification is provided to a device associated with the request. The notification indicates that the requested operation requires a quorum of approvals before the requested operation can be performed.

At 410, a timer is initiated. The timer indicates when a quorum of approvals for the requested operation needs to be received. In some embodiments, the timer is specified by an administrator associated with the entity. In some embodiments, the timer is a default amount of time (e.g., 30 minutes).

At 412, it is determined whether the timer has expired. In response to a determination that the timer has not expired, process 400 proceeds to 414. In response to a determination that the timer has expired, process 400 proceeds to 424.

At 414, the system waits for responses from the approvers included in the set of approvers.

At 416, it is determined whether a quorum of approvals has been obtained. In some embodiments, a quorum of approvals is obtained in the event a particular number of approvers included in the set approve of the operation request. In some embodiments, a quorum of approvals is reached in the event a majority of approvers included in the set approve of the operation request. In some embodiments, a quorum of approvals is reached in the event all of the approvers included in the set approve of the operation request. In some embodiments, a quorum of approvals is reached in the event approvals are received from certain types of approvers. For example, a quorum specification may indicate that at least one approval is needed from an approver from group A comprised of a first subset of approvers and at least one approval is needed from an approver from group B comprised of a second subset of approvers.

In response to a determination that the quorum of approvals has been obtained, process 400 proceeds to 418. In response to a determination that the quorum of approvals has not been obtained, process 400 returns to 412.

At 418, it is determined whether the operation is to be performed by a storage system. In response to a determination that the operation is to be performed by a storage system, process 400 proceeds to 420. For example, an operation to be performed by the storage system may include removing one or more nodes from the storage system, modifying a configuration associated with the storage system, removing a particular object from the storage system, adding or removing an administrator of the storage system, modifying protocols supported by the storage system, modifying an audit log retention period, suppressing alerts, disabling two-factor authentication, adding one or more nodes to the storage system, etc.

In response to a determination that the operation is not to be performed by the storage system, i.e., the operation is performed by the cloud-based management system, process 400 proceeds to 422. For example, an operation to be performed by the cloud-based management system may include modifying the number of approvers needed to obtain a quorum (e.g., modifying the number from 4 approvers to 1 approver), deleting an approver from the set of approvers, modifying one or more privileges associated with a user account (e.g., a hacker wants admin level privileges), adding a new operation or removing an existing operation from the set of operations, etc.

At 420, a command to perform the requested operation is provided to a storage system associated with the request. In some embodiments, the cloud-based management system provides the command to the storage system as soon as the quorum of approvals has been obtained. In some embodiments, the cloud-based management system provides the command to the storage system after the timer has expired. This provides approvers with the ability to change their response in the event they accidentally approved the requested operation.

At 424, the operation is prevented from being performed. The cloud-based management system denies the requested operation from being performed and at 426 provides to the user a notification that the requested operation has been denied.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention.

Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    receiving a request to perform an operation for a storage system;
    determining that the requested operation is associated with a policy that requires a quorum of approvals before being allowed to be performed;
    tracking a timer for the quorum of approvals;
    determining, using a cloud-based management system remote from the storage system, that the quorum of approvals has not been obtained within a time period tracked using the timer;
    logging in a log an indication that the requested operation is denied;
    analyzing denied operations in the log to determine that anomalous behavior has occurred, wherein the anomalous behavior is determined to have occurred in response to determining that the operation has been requested more than a threshold number of times within the time period without obtaining the quorum of approvals; and
    in response to determining that anomalous behavior has occurred, providing a notification to an administrator.

2. The method of claim 1, wherein the operation includes at least one of the following: removing one or more nodes from the storage system, removing a particular object from the storage system, adding or removing the administrator of the storage system, modifying protocols supported by the storage system, modifying an audit log retention period, suppressing alerts, disabling two-factor authentication, adding one or more additional nodes to the storage system, or modifying a configuration associated with the storage system.

3. The method of claim 1, wherein the quorum of approvals is needed from at least a subset of a set of approvers.

4. The method of claim 1, wherein the quorum of approvals is needed from a majority of a set of approvers.

5. The method of claim 1, wherein the quorum of approvals is needed from all users included in a set of approvers.

6. The method of claim 1, further comprising providing a corresponding notification of the requested operation to all approvers included in a set of approvers.

7. The method of claim 6, wherein the set of approvers includes a first administrator associated with the cloud-based management system and a second administrator associated with the storage system.

8. The method of claim 1, further comprising receiving a corresponding response from one or more approvers included in a set of approvers.

9. The method of claim 1, wherein determining that the quorum of approvals has not been obtained within the time period includes determining whether the quorum of approvals has been obtained from a required number of specified approvers within the time period tracked using the timer.

10. The method of claim 9, wherein the requested operation is denied from being performed in response to a determination that the quorum of approvals has not been obtained from the required number of specified approvers within the time period tracked using the timer.

11. The method of claim 1, wherein the storage system received a previous request to perform the operation.

12. The method of claim 11, wherein the storage system determined that the operation is associated with the policy that requires the quorum of approvals.

13. The method of claim 12, wherein the storage system provided to a requesting user associated with the previous request a second notification to send the request to perform the operation for the storage system to the cloud-based management system.

14. The method of claim 1, wherein the policy indicates one or more operations that need the quorum of approvals before being allowed to be performed.

15. A computer program product embodied in a non-transitory computer readable medium and comprising computer instructions for:

receiving a request to perform an operation for a storage system;

determining that the requested operation is associated with a policy that requires a quorum of approvals before being allowed to be performed;

tracking a timer for the quorum of approvals;

determining, using a cloud-based management system remote from the storage system, that the quorum of approvals has not been obtained within a time period tracked using the timer;

logging in a log an indication that the requested operation is denied;

analyzing denied operations in the log to determine that anomalous behavior has occurred, wherein the anomalous behavior is determined to have occurred in response to determining that the operation has been requested more than a threshold number of times within the time period without obtaining the quorum of approvals; and in response to determining that anomalous behavior has occurred, providing a notification to an administrator.

16. A system, comprising:

one or more processors configured to:

receive a request to perform an operation for a storage system;

determine that the requested operation is associated with a policy that requires a quorum of approvals before being allowed to be performed;

track a timer for the quorum of approvals;

determine that the quorum of approvals has not been obtained within a time period tracked using the timer;

log in a log an indication that the requested operation is denied;

analyze denied operations in the log to determine that anomalous behavior has occurred, wherein the anomalous behavior is determined to have occurred in response to determining that the operation has been requested more than a threshold number of times within the time period without obtaining the quorum of approvals; and in response to a determination that anomalous behavior has occurred, provide a notification to an administrator; and a memory coupled to the one or more processors and configured to provide the one or more processor with instructions.

* * * * *